F. E. HUTCHINGS.
ROTARY WHEEL GUARD FOR CARS.
APPLICATION FILED MAY 13, 1908.
920,467.
Patented May 4, 1909.
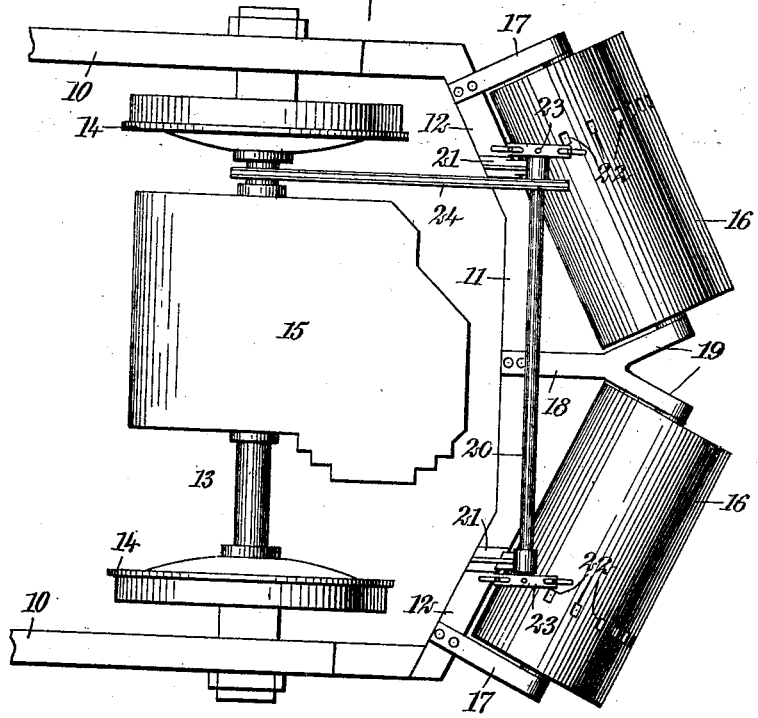
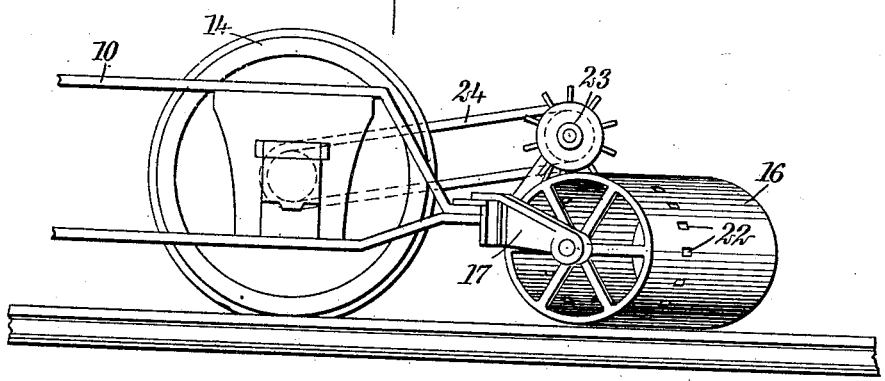
WITNESSES
F. D. Sweet
C. W. Fairbank
INVENTOR
Frederick E. Hutchings
BY Munn & Co.
ATTORNEYS

UNITED STATES PATENT OFFICE.

FREDERICK E. HUTCHINGS, OF NEW YORK, N. Y.

ROTARY WHEEL-GUARD FOR CARS.

No. 920,467.  Specification of Letters Patent.  Patented May 4, 1909.

Application filed May 13, 1908. Serial No. 432,604.

*To all whom it may concern:*

Be it known that I, FREDERICK E. HUTCHINGS, a citizen of the United States, and a resident of the city of New York, borough of Brooklyn, in the county of Kings and State of New York, have invented a new and Improved Rotary Wheel-Guard for Cars, of which the following is a full, clear, and exact description.
This invention relates to certain improvements in car fenders or guards, and more particularly to that type of fender in which there are employed rotary cylinders or drums which are positively rotated upon the movement of the car and serve to remove persons or obstructions from the track and prevent the car from passing over them.

One object of my invention is to provide two separate rotary members, preferably in the form of cylinders, and each disposed adjacent one track and closely in front of the corresponding front wheel of the car truck. The member is continuously rotated while the car is moved, and the direction of rotation is such that any obstruction coming in contact with the rotary member will be brushed aside and prevented from passing under the wheel.

A further object of the invention is to provide an improved supporting means for the rotary members and an improved means for transmitting motion to said members.

Reference is to be had to the accompanying drawings, forming a part of this specification, in which similar characters of reference indicate corresponding parts in both the figures, and in which—

Figure 1 is a top plan view of a portion of a car provided with my improved wheel guard or fender; and Fig. 2 is a side elevation thereof.

In the accompanying drawings I have illustrated a portion of a street car having a truck frame including longitudinally-disposed portions 10, a front transverse portion 11, and diagonally-disposed corner portions 12. The truck frame serves to support suitable journals for the car axle 13, and the latter has rigidly secured thereto the ordinary car wheels 14. The car axle is connected to any suitable means for rotating the same, for instance, a motor inclosed in a casing 15.

In my improved fender or guard, I provide two separate rotary members 16, 16, each extending rearwardly from the center line of the car and each extending across one track in front of the wheel thereof. The rotary member is preferably in the form of a drum or cylinder and is journaled at opposite ends by suitable arms carried by the truck frame. Two outer arms 17, 17, extend out at right angles from the diagonal portions 12 of the truck frame to support the outer ends of the axles of the cylinders, and a center arm 18 having branches 19 serves to support the inner ends of the cylinders. The cylinders may be formed in any suitable manner, but as shown, they are formed with a cylindrical shell of sheet metal to which may be secured a covering or coating of rubber, fiber, fabric, matting, or any other suitable material.

For operating the cylinders, I provide a shaft 20, mounted in bearings on the ends of suitable arms 21 carried by the truck frame. The shaft is substantially parallel to the front member 11 of the truck frame, but it is not parallel with either of the two drums or cylinders. Each cylinder is provided with a plurality of slots 22 in the periphery thereof, and the shaft carries sprocket wheels 23 at opposite ends. The teeth of the sprocket wheels are adapted for insertion within the slots, and serve to rotate both drums simultaneously in the same direction upon the rotation of the shaft. The shaft is rotated from the car axle in any suitable manner, as, for instance, by a chain or belt 24 and suitable sprockets or pulleys on the shaft and axle.

The device is so designed that it may be applied to the standard trucks already in use on cars, and does not necessitate any changes in said trucks, save the securing of the arms 17, 18 and 21 thereto. The drums or cylinders are disposed closely adjacent the truck frame and as near to the wheels as is possible in the standard type of truck construction. The drums come beneath the car platform and do not serve as fenders for the car as much as they serve as guards for the car wheels. Should a person fall on the track or should an obstruction of any kind be encountered by the guard, the rotation of the drums will serve to move the person or obstruction aside and out of the path of the wheel.

If desired, the space between the upper surface of the drums and the under surface of the car truck, may be provided with any suitable form of screen to prevent any object from passing over the cylinders, and the space at the center between the two may also, if desired, be provided with a screen. The cylinders are preferably spaced a slight distance above the track, so that they do not normally contact therewith, but the elevation may be varied in accordance with the condition of the road-bed over which the car is to travel.

Having thus described my invention, I claim as new and desire to secure by Letters Patent:

1. A wheel guard for cars, including a drum or cylinder disposed in front of the car wheel and having a plurality of slots therein, a sprocket wheel adjacent said drum and having teeth entering said slots, and means for rotating said sprocket wheel from said car wheel.

2. A wheel guard for cars, including a drum or cylinder disposed in front of the car wheel, the axis of said drum being at an angle to the axis of the wheel, and said drum having a plurality of slots or openings therein, a sprocket wheel adjacent the drum and having the axis thereof parallel to the axis of the car wheel, and means for rotating said sprocket wheel from said car wheel.

3. A wheel guard for cars, including two rotatable drums or cylinders disposed in front of the car wheels and each having its outer end inclined rearwardly, and each being provided with a plurality of slots or openings therein, a sprocket wheel adjacent each of said drums and having teeth entering said slots, and means for rotating said sprocket wheels.

4. The combination with a car truck frame having longitudinally-disposed side portions, a transversely-extending front portion and diagonally-disposed connecting portions, of two rotary drums, each having its axis substantially parallel to one of said diagonally-disposed connecting portions of the frame, arms secured to said frame and supporting each of said drums at the ends thereof, a shaft substantially parallel to said transverse portion and supported thereby, arms carried by said truck frame for supporting said shaft, means at the ends of said shaft for engaging with said drums to rotate the same, and means for rotating said shaft from the car axle.

In testimony whereof I have signed my name to this specification in the presence of two subscribing witnesses.

FREDERICK E. HUTCHINGS.

Witnesses:
C. W. FAIRBANK,
JOHN P. DAVIS.